United States Patent
Alterman et al.

(10) Patent No.: US 6,882,856 B1
(45) Date of Patent: Apr. 19, 2005

(54) METHOD FOR DYNAMICALLY CONFIGURING GROUP CALLS IN A RADIO SYSTEM

(75) Inventors: Steven S. Alterman, Davie, FL (US); Mahesh Bhuta, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/553,252

(22) Filed: Apr. 20, 2000

(51) Int. Cl.[7] ............................................... H04Q 7/20
(52) U.S. Cl. ..................... 455/519; 455/518; 455/519; 455/520; 455/521; 455/522; 455/426.1; 455/426.2; 455/458; 455/456.1; 455/456.2; 370/312; 370/328; 370/390; 370/348; 370/401; 345/329
(58) Field of Search .............................. 455/519, 518, 455/520, 521, 522, 15, 455, 426, 458, 456; 370/312, 328, 320, 348, 801; 345/329

(56) References Cited

U.S. PATENT DOCUMENTS

| | | | |
|---|---|---|---|
| 4,817,190 A | | 3/1989 | Comroe et al. ............... 455/11 |
| 5,058,199 A | * | 10/1991 | Grube .......................... 455/15 |
| 5,471,646 A | | 11/1995 | Schultz ...................... 455/54.1 |
| 6,031,832 A | * | 2/2000 | Turina .......................... 370/348 |
| 6,141,347 A | * | 10/2000 | Shaughnessy et al. ...... 370/390 |
| 6,204,844 B1 | * | 3/2001 | Fumarolo et al. ........... 345/733 |
| 6,304,558 B1 | * | 10/2001 | Mysore ....................... 370/312 |
| 6,330,244 B1 | * | 12/2001 | Swartz et al. ............... 370/401 |

* cited by examiner

*Primary Examiner*—David Hudspeth
*Assistant Examiner*—David Q Nguyen
(74) *Attorney, Agent, or Firm*—Scott M. Garrett; James A. Lamb

(57) ABSTRACT

A method for setting up a dynamic group call includes the step (202) of selecting a group of radios (120, 121) by a dynamic group call originator (122). Once the radios that will be part of the dynamic group have been selected, the dynamic group call originator (122) transmits a dynamic group call message(s) to each of the selected radios. Each of the transmitted dynamic group call message(s) includes the IP address of one of the selected radios. Upon each of the target radios receiving their individually directed message, the target radios (120, 121) can each send an optional acknowledgment message to the dynamic group call originator (122). The originator (122) and the target radios (120, 121) then switch to the dynamic talk group number assigned by the dynamic talk group message. Once the dynamic talk group call has been completed, the originator of the dynamic group call can send a dynamic group call disconnect message, which once received by the target radios (120, 121) causes them to revert back to their previous operational state. Alternatively, instead of the dynamic talk group originator transmitting a disconnect message, the radio communication system controller (110) can transmit a disconnect message such as based on a timer (e.g., hangtimer, etc.).

6 Claims, 3 Drawing Sheets

METHOD FOR DYNAMICALLY CONFIGURING GROUP CALLS IN A RADIO SYSTEM

TECHNICAL FIELD

This invention relates in general to radio communication systems, and more particularly, to a method for dynamically configuring group calls in a radio system.

BACKGROUND

Radio talk groups are typically pre-defined and static and can not be changed by any individual subscriber radio user within a radio communication system. In a trunked radio system for example, if a radio is programmed with a particular talk group that is linked to a particular radio channel selection, the radio user can not alter the members assigned to that talk group. Although preprogrammed talk groups are a valuable feature, especially among radio users who work in teams (e.g., building security guards, etc.); preprogrammed talk groups have their limitations.

At times it may become desirable for a particular radio user to establish a radio talk group that includes select radio users located in the system. For example, a supervisor may want to speak to a few select subordinates. Some solutions to the above problem have come in different forms. One feature found in trunked radio systems called "Dynamic Regrouping", is a way by which an operator at the fixed-end (e.g., at the central controller) of a radio communication system, can group two or more radio users together. The fixed-end operator can cancel the dynamic regrouping when the radio users no longer need to communicate with each other. The main problem with dynamic regrouping is that it requires an operator at the fixed-end to set up the group. Although acceptable for private trunked systems (e.g., city fire department system), is not practical in a large public metropolitan radio communication system.

Another solution for providing dynamic talk group is found in U.S. Pat. No. 5,471,646, entitled "Method for establishing a user defined radio talk group in a trunked radio communication system", assigned to Motorola, Inc. In the above patent, radio users who want to be part of the same radio talk group all select the same virtual talk group number at their respective radios. Once all of the radio users who want to be part of the virtual group have selected the same virtual talk group number, they all can talk and listen to their group conversation using the assigned virtual talk group. One drawback to this invention is that each of the radio users who wants to be part of the talk group must perform some action, in this case select the same virtual talk group number, to become affiliated with the talk group. This thus requires some coordination between the potential group members prior to the talk group being set up. For example, this may require the potential virtual talk group members to communicate with each other before hand and coordinate when they will all transfer to the virtual talk group. Given the above, a need exists in the art for a method for dynamically configuring a group call by a single device.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
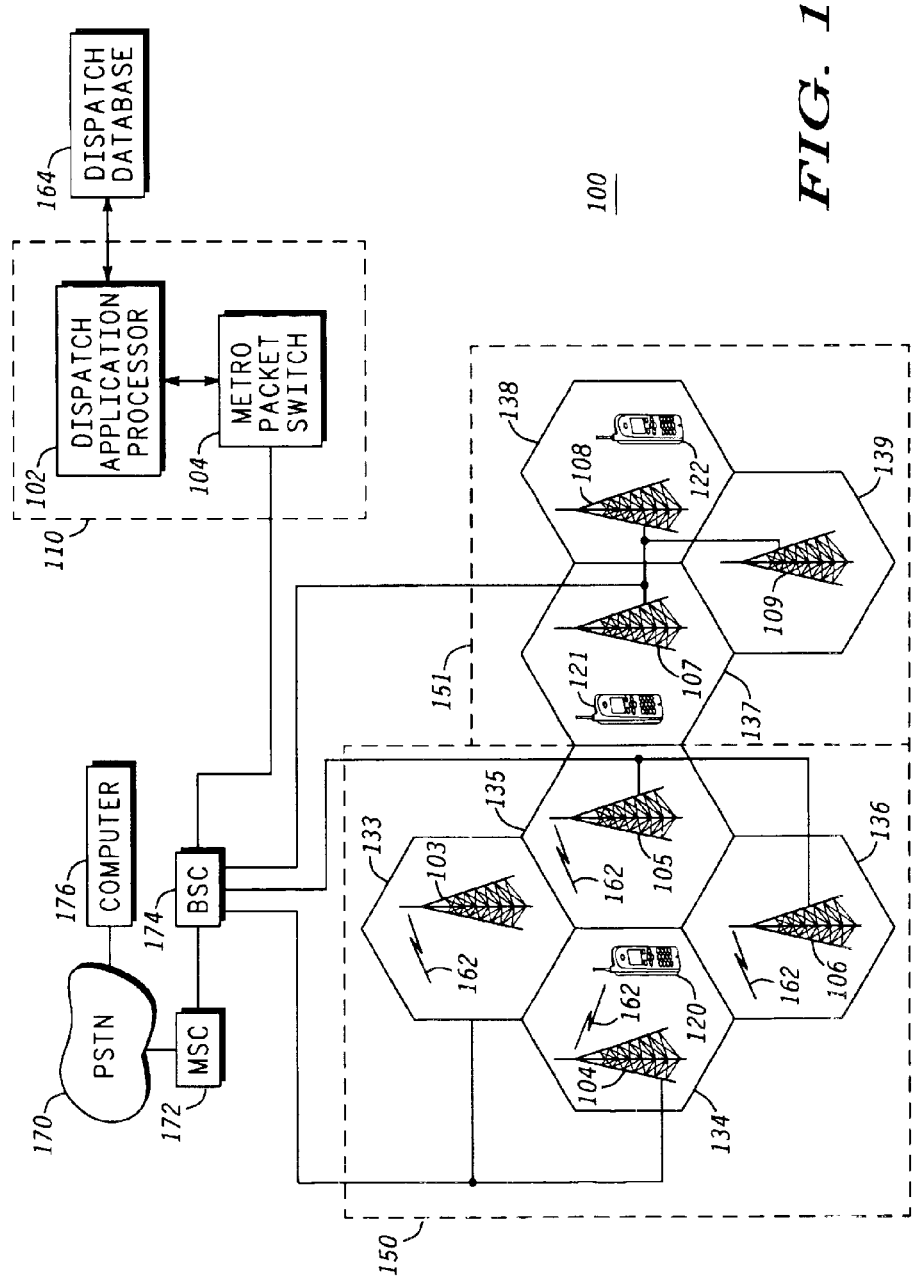
FIG. 1 illustrates a block diagram of an exemplary communication system that may beneficially employ the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a diagram of a wireless communication system 100 that may beneficially employ the present invention. The communication system 100 includes a system or dispatch controller 110, a plurality of base sites 103–109, a plurality of communication units 120–122, a base site controller ("BSC") 174, a mobile switching center ("MSC") 172 and a dispatch database 164. Each base site 103–109 provides communication service to a corresponding service coverage area 133–139. The base site service coverage areas 133–139 are grouped into one or more location areas 150–151 (two shown). Each location area 150–151 thus includes one or more of the base site service coverage areas 133–139 and, accordingly, one or more base sites 103–109. Base sites 103–109 communicate using radio frequency signals 162 to radios 120–122. The base sites 103–109 are coupled to a metro packet switch ("MPS") 104 via communications links, such as T1 wireline, fiber optic, microwave links, etc. and preferably communicate using frame relay packet-switching technology.

In the preferred embodiment, the wireless portion of communication system 100 comprises an IDEN® radio communication system that is commercially available from Motorola, Inc. of Schaumburg, Illinois. The wireless portion of communication system includes the location areas 150–151, the communication units 120–122, base sites 103–109, the MSC 172, the BSC 174 and the dispatch controller 110.

The Dispatch Application Processor ("DAP") 102 functions to allocate communication resources amongst dispatch service users, such as the users of communication units 120–122 and performs the important function of alerting all members of a dispatch group that a dispatch call is imminently, or presently, underway, so that all members of the dispatch group can participate in the call. The metropolitan packet switch 104 comprises a switch, as well understood in the art, that routes audio signals between sites in order to facilitate the inclusion of group call members that are located in other sites that are also serviced by the radio dispatch system. The dispatch database 164 is coupled to the dispatch application processor 102 and includes information regarding current dispatch operability states of communication units that are serviced by the radio dispatch system. Such information includes, for example, individual identification (ID), group ID, alias information, roaming status, priority information, and so forth, as is well understood by one of ordinary skill in the art.

The base sites 103–109 preferably support one or more trunking and cellular communications platforms, such as frequency division multiple access (FDMA), time division multiple access (TDMA), or code division multiple access (CDMA). In the preferred embodiment, the base sites 103–109 comprise IDEN Enhanced Base Site Transceiver Sites. The base sites 103–109 are coupled to the metro packet switch 104 via the BSC 174. The BSC 174 is the controlling element between the base sites 103–109 and the MSC 172. The BSC 174 also transcodes the digital VSELP phone calls to pulse code modulation (PCM) to enable communications with a communication network such as the public switched telephone network (PSTN) 170. The MSC 172 provides the interface between the PSTN 170 and the Motorola IDEN radio network. The MSC 172 is the telephone switching office for all calls that are sent or received by subscriber units 120–122.

The communication units 120–122 preferably comprise any wireless devices, such as wireless data terminals, radios, radiotelephones, etc., that are capable of receiving and transmitting (transceiving) data packets, or radio dispatch communications, or cellular communications, or any combination thereof. An example of such a communication unit is an IDEN i1000plus portable radio manufactured by Motorola, Inc. of Schaumburg, Ill. In alternative embodiments, one or more of the communication units 120–122 may comprise a data terminal coupled to a wireless communication device. The communication units 120–122 are alternatively referred to herein as radios 120–122. The system controller 110 preferably comprises an IDEN Dispatch Application Processor 102 and a metro packet switch 104. The dispatch database 164 is coupled to the DAP 102 as shown.

When each communication unit 120–122 is initially activated, it registers with the controller 110 by first identifying a serving base site from control channel transmissions of all the base sites 103–110, as is well known in the art. Then the unit transmits a registration message to the controller 110 via the identified serving base site. Upon receiving the registrations, the controller 110 affiliates each communication unit 120-122 with its serving base site and the location area that includes the service coverage area of the serving base site. The controller 110 then stores the registrations in the dispatch database 164.

As is well known in existing IDEN radio communication systems, when a mobile radio (e.g., 122) desires to engage in a dispatch call such as a group call with one or more mobile communication units, the requesting communication unit 122 transmits a request to communicate to its serving base site 108 over a control channel. The request to communicate includes the dispatch IDs of the requesting communication unit 122 and the communication unit (e.g., 121) or dispatch group that is the intended target of the desired communication, and identifies each communication unit as either a requester or target as is well known.

Upon receiving the request at the base site 108, the base site 108 provides the request to the controller 110. The controller 110 queries the dispatch database located either within the controller 110 or external to the controller 110 to determine which location area(s) currently contain the target communication unit(s). Once the controller 110 locates the target communication unit(s), the controller 110 attempts to contact the target communication unit(s) as is well-known in the art and proceeds to establish a communication path between the requesting communication unit and the target communication unit(s) to support the call.

The controller 110 can support a radio dispatch operational mode that handles both individual dispatch calls such as private calls between two communication units, as well as group dispatch calls. The dispatch mode operates much like a wide-area walkie-talkie radio call and uses push-to-talk (PTT) to gain almost instantaneous voice access to individuals and groups. Unlike a cellular phone, a dispatch call has almost no setup time because it does not require dial up access to a mobile switch center (MSC) and the public switched telephone network (PSTN). The controller 110 also supports a packet data mode of operation.

In accordance with the present invention, using packet data and the Internet Protocol (IP) address assigned to each iDEN subscriber radio 120–122, a single radio user or any Internet appliance can configure group calls dynamically on the fly. The radio user (dynamic group call originator) will be able to select radio users using aliases (e.g., user names, etc.) and/or IP addresses from a list stored within the subscriber radio 120–122. When all of the required users are selected from the list, special packet data messages are sent to each of those selected radios (one message sent to each of the selected radios). The special packet data message will then cause the "target" subscribers to switch to an assigned reserved talk group number, where the dynamic group call will proceed. An additional feature of the present invention includes an optional acknowledgment by each of the target radios to the special packet data message. These acknowledgment messages by each of the target radios gives the dynamic group call originator the ability to track which radios (IP addresses) responded and participated in the group call and which radios did not respond.

Figure 2:
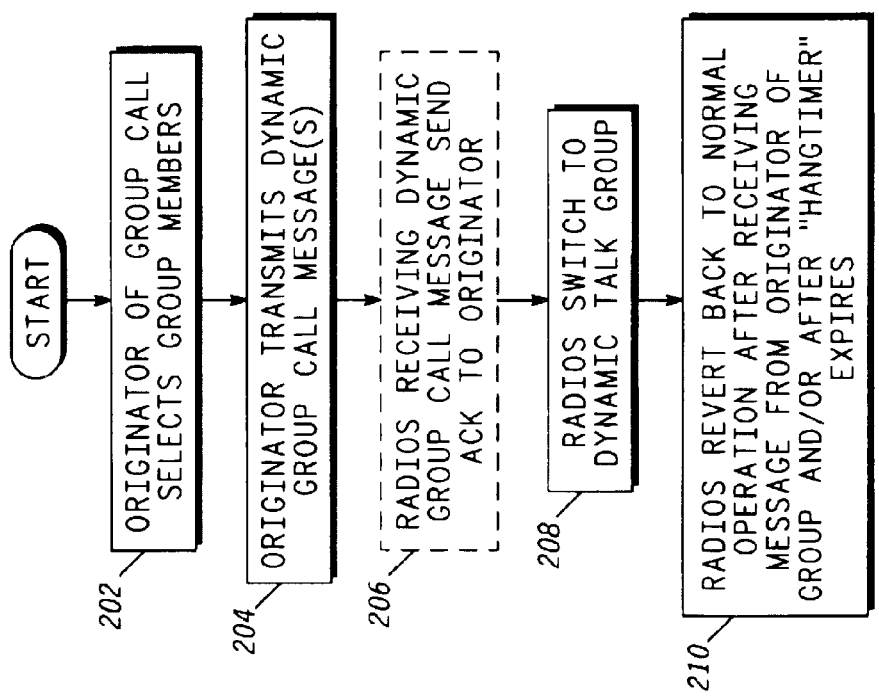
FIG. 2 shows a simplified flowchart that highlights the steps taken in accordance with the present invention in order to establish a dynamic group call by a radio user.

Referring now to FIG. 2, there is shown a simplified flow chart showing the steps taken in order for a particular radio user to establish a dynamic group call in accordance with the invention. In step 202, the originator of the group call, for example the user of radio 122; selects the group members (radio users, also referred to as target radios) he wants to participate in the group call. This is accomplished by the user of radio 122 scrolling through a list of radio users stored in radio 122. This list preferably includes the IP addresses of all of the radios in the list as well as an alias that can help identify each of the radio users, for example, the name of the user.

Once all of the dynamic talk group members have been selected in step 202, in step 204 the radio 122 ("dynamic group call originator") transmits dynamic group call set up messages using packet data to each of the selected target radios, for example radios 120, 121. These messages are preferably all automatically sent by radio 122, although they could be sent one at a time at the option of the user of radio 122. Optionally in step 206, upon radios 120 and 121 receiving the dynamic group call message addressed to each of the radios, they individually acknowledge the dynamic group call message received by sending an acknowledgment message back to radio 122. This allows radio 122 to track which radios that had been selected will participate in the dynamic talk group call.

In step 208, once the dynamic group call messages have been received by each of the target radios, radios 120, 121, they each switch to the specific dynamic talk group number assigned by the dynamic group call message sent by radio 122. Once the radio 122 and the target radios 120, 121 have switched to the assigned dynamic talk group, the group call can proceed as normal. In accordance with the invention, the originating radio 122 sends dynamic group call disconnect messages at step 210 to each of the radios 120, 121 in the dynamic talk group in order to disconnect the dynamic talk group. Alternatively, or in addition to, the ability of the originating radio 122 to send disconnect messages, the controller 110 can send a "hangtimer" disconnect message if there has been no activity by any of the radios in the dynamic talk group 120–122 after a predetermined period of time has elapsed, or if the dynamic group call has exceeded a predetermined period of time.

It is worth noting that since the dynamic group call setup in accordance with the invention uses packet data and the IP address information to set up the participating radios in the dynamic group call, that not only can a subscriber radio in the system 100 set up a dynamic talk group call, but any communication device (e.g., computer 176, etc.) connected to the communication system 100 can set up the call. For example, a computer coupled through the PSTN 170 via the MSC 172 could send dynamic group set up messages to select radios in the system in order to establish a group call.

Figure 3:
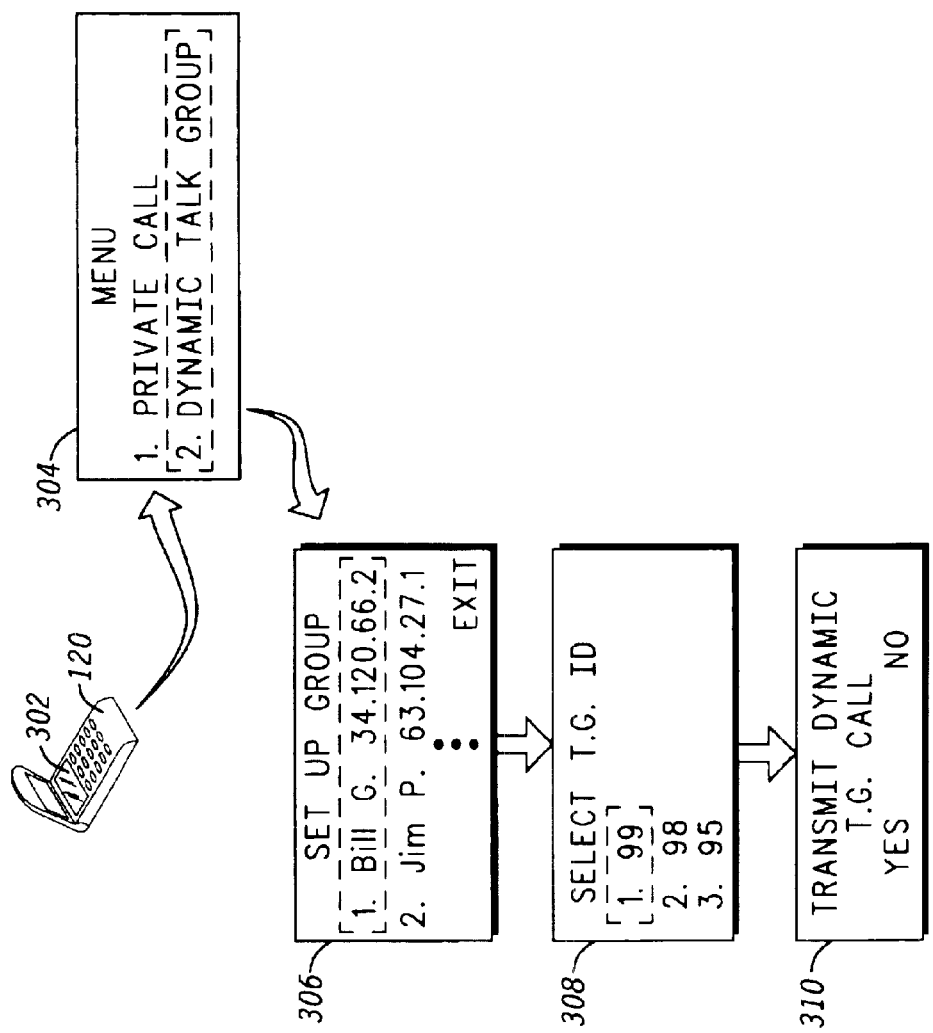
FIG. 3 shows a graphical flow diagram showing different exemplary portable radio display contents in accordance with the invention.

In FIG. 3, there is shown a graphical illustration of some of display screens shown to a radio user who wants to set up a dynamic group call in accordance with the present invention. Radio 120 includes a display 302, which functions as a user interface that allows the radio user to select the dynamic talk group features and select the target member(s) for the group call.

When a radio user wants to set up a dynamic talk group he scrolls through the radio feature menu until he reaches the dynamic talk group feature as shown in display 304. Once the dynamic talk group feature is selected, a set up group screen 306 is presented to the radio user. The user then scrolls through the list and selects all of the people he wants to include in his dynamic group call. This screen also allows the radio user to enter an IP address for one or more target radios that are not found in the list.

Once all of the dynamic group members have been selected, the user exits the set up screen 306 and a select talk group identification (ID) screen 308 is presented. A default talk group ID (e.g., 99, etc.) is presented to the user or the user can select from a list of talk group IDs which have been specifically assigned to the system 100 for the purposes of establishing dynamic talk groups. After the talk group ID number has been selected, a transmit dynamic talk group screen 210 is presented to the user, in order for the user to cause radio 120 to transmit dynamic talk group setup messages to each of the target radios (e.g., 121, 122) using their IP addresses. Alternatively, the setup messages can be transmitted automatically after the dynamic talk group ID number is selected.

In another embodiment of the invention, the system controller 110 can assign the dynamic talk group ID to the dynamic group call originator in order to reduce system contention. In this embodiment, the dynamic group call originator can send a request in to the system controller 110 in order to reserve a dynamic talk group ID, prior to or in association with the dynamic talk group message(s) being transmitted by the dynamic talk group originator.

Other user control screens can include a screen that shows which of the target radios acknowledged the talk group set up message sent by radio 120, and a screen for allowing the radio 120 to transmit a dynamic talk group call disconnect message to each of the radios participating in the group call.

As has been discussed above, the present invention uses IP addresses of radios 120–122 to send messaging, preferably using packet data that sets up a dynamic talk group. The radios 120, 121 can also in accordance with the invention inform the originator of the dynamic talk group that they do not want to participate by sending to the originator a message. The radios 120–122 can also setup and breakdown a dynamic talk group they have created as previously discussed. By giving an individual device, for example radio 120 or computer 176 coupled to a packet data radio through the PSTN 170 (FIG. 1), the ability to set up a dynamic talk group independently and without the need for action from the communication system 100, provides for improved communication flexibility is provided for the communication system users.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for establishing a dynamic talk group in a radio communication system, comprising the steps of:

(a) selecting a set of target radios from amongst a plurality of subscriber radios by a dynamic group call originator, each one of the plurality of subscriber radios having a unique Internet Protocol (IP) address, the dynamic group call originator being a subscriber radio located in the radio communication system;

(b) querying a dispatch database to determine a current location area for each one of the plurality of subscriber radios in the set of target radios;

(c) transmitting a message from the dynamic group call originator to each of the set of target radios whose IP addresses match those radios selected in step (a), the message containing a dynamic talk group number; and (d) causing the target radios and the dynamic group call originator to establish a dynamic talk group where the dynamic group call will take place, using the dynamic talk group number.

2. A method as defined in claim 1, wherein the message transmitted to each of the target radios in step (b) comprises a packet data message.

3. A method as defined in claim 1, further comprising the further step of:

(d) transmitting an acknowledgment message to the dynamic group call originator from each of the target radios that successfully received the message transmitted in step (b).

4. A method as defined in claim 1, comprising the further step of:

(e) transmitting a dynamic talk group disconnect message by the dynamic group call originator to the target radios.

5. A method as defined in claim 4, comprising the further step of:

(f) disconnecting the target radios from the dynamic group call in response to step (e).

6. A method as defined in claim 1, wherein at least one of the target radios in response to step (b) transmits a message to the dynamic group call originator informing it that it is not available to participate in the dynamic talk group.

* * * * *